US012195207B2

(12) United States Patent
L et al.

(10) Patent No.: US 12,195,207 B2
(45) Date of Patent: Jan. 14, 2025

(54) SYSTEM AND METHOD FOR LAUNCHING MULTIPLE SATELLITES FROM A LAUNCH VEHICLE

(71) Applicant: INDIAN SPACE RESEARCH ORGANISATION, Bangalore (IN)

(72) Inventors: Sowmianarayanan L, Kerala (IN); Hutton R, Kerala (IN); Jayakumar B, Kerala (IN); Anilkumar Ak, Kerala (IN); Negi Deepak, Kerala (IN); Sivan K, Kerala (IN)

(73) Assignee: INDIAN SPACE RESEARCH OR-GANISATION, Bangalore (IN)

( * ) Notice: Subject to any disclaimer, the term of this patent is extended or adjusted under 35 U.S.C. 154(b) by 289 days.

(21) Appl. No.: 17/279,232

(22) PCT Filed: Apr. 30, 2019

(86) PCT No.: PCT/IN2019/050344
§ 371 (c)(1),
(2) Date: Mar. 24, 2021

(87) PCT Pub. No.: WO2020/065660
PCT Pub. Date: Apr. 2, 2020

(65) Prior Publication Data
US 2021/0403181 A1 Dec. 30, 2021

(30) Foreign Application Priority Data
Sep. 24, 2018 (IN) .............................. 201841035794

(51) Int. Cl.
*B64G 1/64* (2006.01)
(52) U.S. Cl.
CPC .................................. *B64G 1/645* (2013.01)

(58) Field of Classification Search
CPC .. B64G 1/645; B64G 1/002; B64G 2001/643; B64G 1/641; B64G 1/64; B64G 1/10
See application file for complete search history.

(56) References Cited

U.S. PATENT DOCUMENTS

| 4,455,943 A * | 6/1984 | Pinson ................... F42B 12/58 |
| | | 102/393 |
| 5,884,866 A | 3/1999 | Steinmeyer et al. |

(Continued)

FOREIGN PATENT DOCUMENTS

WO  2016030890 A1  3/2016

OTHER PUBLICATIONS

Gibbons, D., & Holemans, W., "Packaging multiple small satellites on a single launch vehicle" 1989, p. 11, Lines 6-11; Figures and pp. 1-13.

(Continued)

*Primary Examiner* — Medhat Badawi
*Assistant Examiner* — Vicente Rodriguez
(74) *Attorney, Agent, or Firm* — Weber Rosselli & Cannon LLP

(57) ABSTRACT

A system (100) and method (300) for launching multiple satellites from a launch vehicle is provided. The system includes a mechanical structure (102) which has one or more mounting means (104A-F), a control unit (106) for controlling the one or more mounting means for positioning and separating the multiple satellites in the mechanical structure, an image capturing system for monitoring the positioning of each satellite in the mechanical structure. The mounting means are adapted to position the satellites in axial, inclined and radial separations at a distance to ensure that each satellite will not come in contact with each other in short duration as well as long duration of orbit evolution.

8 Claims, 3 Drawing Sheets

(56) References Cited

U.S. PATENT DOCUMENTS

| | | | | |
|---|---|---|---|---|
| 6,296,206 | B1* | 10/2001 | Chamness | B64G 1/00 |
| | | | | 244/173.3 |
| 6,416,018 | B2* | 7/2002 | DiVerde | B64G 1/002 |
| | | | | 244/137.1 |
| 7,511,612 | B1* | 3/2009 | Monroe | G08B 13/19673 |
| | | | | 348/148 |
| 9,463,882 | B1* | 10/2016 | Field | B64G 1/645 |
| 10,538,348 | B2* | 1/2020 | Riskas | B64G 1/641 |
| 2004/0024528 | A1* | 2/2004 | Patera | G08G 5/045 |
| | | | | 340/961 |
| 2005/0127242 | A1* | 6/2005 | Rivers, Jr. | B64D 1/02 |
| | | | | 244/137.1 |

OTHER PUBLICATIONS

Chobotov, V. A., "Orbital Mechanics Second Edition" AIAA Education Series, Reston, VA; American Institute of Aeronautics and Astronautics. Description, pp. 316-318.

\* cited by examiner

```
┌─────────────────────────────────────────────────────────────────┐
│ POSITIONING MULTIPLE SATELLITES IN ONE OR MORE MOUNTING         │
│ MEANS PROVIDED IN A MECHANICAL STRUCTURE. THE MOUNTING          │
│ MEANS ARE ARRANGED AT A DISTANCE TO SATISFY THE LONG TERM       │
│ COLLISION FREE REQUIREMENT BASED ON A MAXIMUM COLLISION         │
│ PROBABILITY                                                 302 │
└─────────────────────────────────────────────────────────────────┘
                                  │
                                  ▼
┌─────────────────────────────────────────────────────────────────┐
│ SEPARATING FIRST SET OF SATELLITES IN AXIAL DIRECTION AND       │
│ SECOND SET OF SATELLITES IN RADIAL DIRECTION                304 │
└─────────────────────────────────────────────────────────────────┘
                                  │
                                  ▼
┌─────────────────────────────────────────────────────────────────┐
│ DIVIDING SECOND SET OF SATELLITES INTO TWO GROUPS BASED ON      │
│ VELOCITY DIRECTION AND ANTI-VELOCITY DIRECTION              306 │
└─────────────────────────────────────────────────────────────────┘
                                  │
                                  ▼
┌─────────────────────────────────────────────────────────────────┐
│ RE-ORIENTING THE STAGE AND SEPARATING THE SATELLITES            │
│ GROUPED UNDER ANY ONE OF THE TWO GROUPS WITH A SMALL ROLL       │
│ RATE BETWEEN 0.20 TO 0.35 DEGREES TO ENSURE SEPARATION OF       │
│ SATELLITES IN AN ORBITAL PLANE ALONG VELOCITY AND ANTI-         │
│ VELOCITY DIRECTIONS                                         308 │
└─────────────────────────────────────────────────────────────────┘
                                  │
                                  ▼
┌─────────────────────────────────────────────────────────────────┐
│ LAUNCHING THE FIRST SET OF SATELLITES ARRANGED IN AXIAL         │
│ DIRECTION, PART OF THE SECOND SET OF SATELLITES ARRANGED IN     │
│ RADIAL DIRECTION AND REMAINING PART OF THE SECOND SET OF        │
│ SATELLITES ARRANGED IN INCLINED DIRECTION FROM THE LAUNCH       │
│ VEHICLE TO SEPARATE THEM WITH APPROPRIATE IN-TRACK DELTA V      │
│ DISTRIBUTION                                                310 │
└─────────────────────────────────────────────────────────────────┘
```

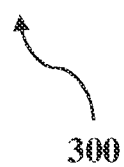

FIGURE 3

SYSTEM AND METHOD FOR LAUNCHING MULTIPLE SATELLITES FROM A LAUNCH VEHICLE

FIELD OF INVENTION

The present embodiment generally relates to a system for launching multiple satellites from a launch vehicle, and more particularly relates to a system and method to ensure separation of multiple satellites which is free of any plume interaction and to satisfy the long term collision free requirement.

BACKGROUND OF THE INVENTION

Conventional satellite deployment systems use multistage launch vehicles to reach an insertion orbit before they individually separate and fly to their final operational orbit. The launch vehicle has a limited amount of power and propulsion, so all satellites should be deployed within a relatively small time window. In case of large number of satellites as payloads, deploying them in relatively quick succession within the limited time window is difficult because of the close proximity and inherent risks of a potential collision between satellites.

Prior art (www.nasaspaceflight.com) discloses the use of retro firing to move the upper stage away after detaching the satellite from the vehicle. Another prior art (U.S. Pat. No. 9,463,882 Bi) discloses a method in which the entire dispenser module with a propulsion unit being separated from the terminal stage and satellites separating later from the dispenser module. However, these methodologies will not help when it is required to deploy large number of satellites in a single attempt, in a safe manner and within the short launch time window.

U.S. Pat. No. 9,463,882 131 discloses a system and method for assembling and deploying satellites. In this invention multiple dispenser modules are used with their own propulsion units to separate a set of satellites from the module. The modules are separated from the terminal stage of the vehicle at designated time and can be manoeuvred away from each other to avoid collision. The limitations of this invention was addressed and novel strategies in the present invention are (1) All satellites were attached at appropriate orientation and separated from the terminal stage directly (2) Providing roll manoeuvre, controlling the timing of the separation and separating the satellites at different angles simultaneously in different directions and (3) The positioning of video imaging system substantiated the clean separation.

Reference: digitalcommons.usu.edu, Proceedings of the AIAA/USU Conference on Small Satellites 2002, Donald E. Keenan, "A Deployment Strategy for Multiple Secondary Payloads on the MLV05 Mission" discloses multiple satellite separations where primary option is separation of various satellites with different relative velocities (delta-v) at different time intervals where the total separation time window was defined as 45 minutes. The limitations of this method addressed using the present invention are (1) nearly the same relative velocity for the satellites by using same separation mechanism (2) the total time of the mission can be limited below 800 s.

Reference: www.nasaspaceflight.com discloses that Russian launcher separated 37 satellites from the back of the rocket when the stage is still firing. In such a system there is a possibility that the satellites can encounter plume of the rocket propulsion system. The limitations of this method addressed using the present invention are (1) the satellites were separated in both the velocity and anti-velocity directions simultaneously (2) suitable mounting direction of satellites avoiding plume interaction (3) positioning of video imaging system captured clean separation of all satellites and ensured absence of plume interaction. Also the absence of any plume was captured by the video imaging system.

To sum up, the prior arts are having many limitations. None of them provide a reliable method for deploying large number satellites in a safe, timely and cost-effective manner. In order to overcome these limitations, an innovative system and method in mission management for deployment of multiple satellites using multi stage launch vehicle is realized. The present embodiment solves one or more of these problems in a unique and economical manner.

SUMMARY OF THE INVENTION

The novel mission management strategy for the deployment of multiple satellites is having the following objects:

The primary object of the invention is clean separation of multiple satellites. Another object of the invention is to ensure separation of multiple satellites with gap build up in the first few orbits.

Still another object of the invention is to ensure separation of multiple satellites which is free of any plume interaction.

Yet another object of the invention is to realize a novel manoeuvring scheme of upper stage to which satellites are attached without any retro firing to move the upper stage away after detaching the satellite from the vehicle.

Further object of the invention is to eliminate the use of any dispenser module with a propulsion unit for assisting satellite deployment.

Still further object of the invention is to ensure that no part of the separation system used to deploy a satellite shall block the path of the satellites separating subsequently.

Another object of the invention is to accomplish all the satellite separation within short mission duration. Still another object of the invention is to provide appropriate mounting direction for safe separation without any collision.

Further object of the invention is to capture all separations by positioning video imaging systems at appropriate places.

In accordance with the aforesaid objects, the present invention provides a novel system and method for deployment of multiple satellites enabling realisation of the above mentioned objects.

In one aspect of the present embodiment a system for launching multiple satellites from a launch vehicle is provided. The system includes a mechanical structure which has one or more mounting means, a control unit for controlling the one or more mounting means for positioning and separating the multiple satellites in the mechanical structure, an image capturing system for monitoring the positioning of each satellite in the mechanical structure. The mounting means are adapted to position the satellites in axial, inclined and radial separations at a distance to ensure that each satellite will not come in contact with each other in short duration as well as long duration of orbit evolution. The mounting means is adapted to position one or more satellites. First set of mounting means are arranged in the axial separation and second set of mounting means are arranged in the inclined separation and third set of mounting means are arranged in the radial separation. The required minimum distance between the separated bodies when they are crossing each other distance are determined based on maximum collision probability ($P_{max}$) which is derived from the following equation (Ref. Vladimir A. Chobotov, Orbital Mechanics, Second Edition, AIAA Educational Series, 1996):

$$P_{max} = \frac{4}{\pi s}\left(\frac{R_s}{R_{min}}\right)^2$$

wherein $R_{min}$ be the minimum distance between them and $R_s$ is the effective collision radius.

In another aspect of the present embodiment, a method for deploying and launching multiple satellites using a mechanical structure at a launching vehicle is provided. The method includes the step of (i) positioning the multiple satellites in a one or more mounting means provided in the mechanical structure, wherein the mounting means are arranged at a distance to satisfy the long term collision free requirement based on a maximum collision probability ($P_{max}$), (ii) separating first set of satellites in axial direction and second set of satellites in radial direction, (iii) dividing second set of satellites into two groups based on velocity direction and anti-velocity direction, (iv) re-orienting the stage and separating the satellites grouped under any one of the two groups with a small roll rate between 0.20 to 0.35 degrees to ensure separation of satellites in an orbital plane along velocity and anti-velocity directions and (v) launching the first set of satellites arranged in axial direction, part of the second set of satellites arranged in radial direction and remaining part of the second set of satellites arranged in inclined direction from the launch vehicle to separate them with appropriate in-track delta v distribution. The video imaging system is appropriately mounted and positioned which can capture all separation events. The separating step ensures that all the satellites can be separated at optimal attitude to meet the desired minimum distance for all separation. The re-orienting step a roll rate controllability is achieved between 0.20 to 0.35 degrees to get the desired angle and direction of separation in the orbital plane. The roll-rate and the timing of the separation is selected so as to achieve the direction of separation in the orbital plane to provide the desired in-track delta-v difference between the two separations to ensure that the two satellites separating do not come in contact with each other on short period as well as long period of orbit evolution. The separating step ensures no interaction between plume of upper stage control thruster and separating satellites.

BRIEF DESCRIPTION OF THE ACCOMPANYING DRAWINGS

The advantages and features of the invention will become more clearly apparent from the following description which refers to the accompanying drawings given as non-restrictive examples only and in which:

FIG. 3 illustrates a flow diagram for deploying and launching multiple satellites using a mechanical structure at a launching vehicle in accordance to the embodiment herein.

DETAILED DESCRIPTION OF THE INVENTION

The present invention will be described herein below with reference to the accompanying drawings. A system and method for launching multiple satellites from a launch vehicle is described herein.

The following description is of exemplary embodiment of the invention only, and is not limit the scope, applicability or configuration of the invention. Rather, the following description is intended to provide a convenient illustration for implementing various embodiments of the invention. As will become apparent, various changes may be made in the function and arrangement of the structural/operational features described in these embodiments without departing from the scope of the invention as set forth herein. It should be appreciated that the description herein may be adapted to be employed with alternatively configured devices having different shaped, components, and the like and still fall within the scope of the present invention. Thus the detailed description herein is presented for purposes of illustration only and not of limitation.

Figure 1:
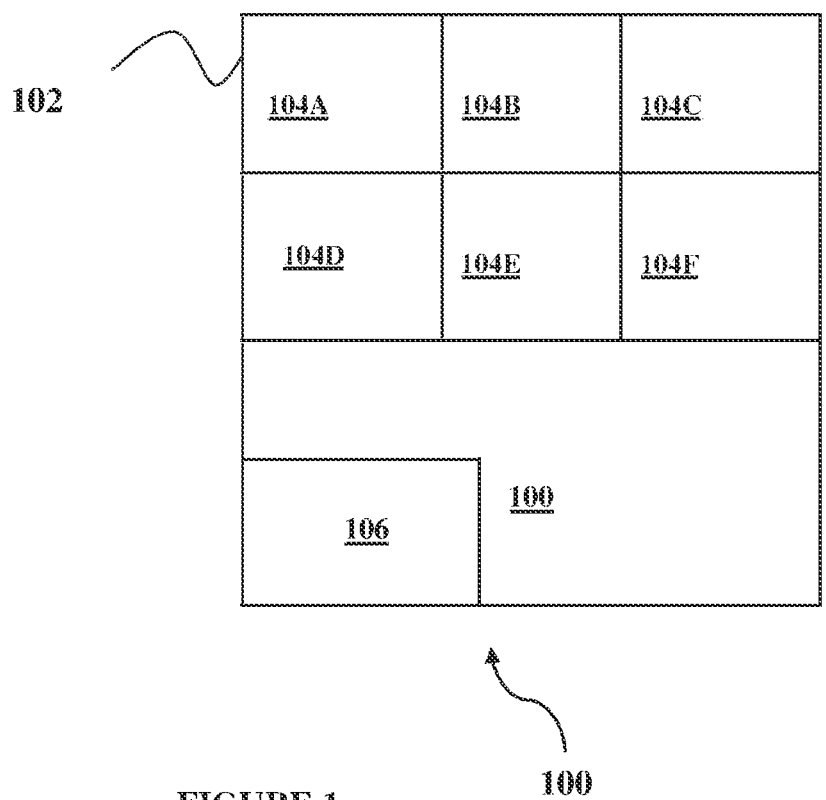
FIG. 1 illustrates a system for launching multiple satellites from a launch vehicle in accordance to the embodiment herein.

FIG. 1 illustrates a system 100 for launching multiple satellites from a launch vehicle in accordance to the embodiment herein. The system 100 includes a mechanical structure 102 which has one or more mounting means 104A-F, a control unit 106 for controlling the one or more mounting means for positioning and separating the multiple satellites in the mechanical structure, an image capturing system (not shown) for monitoring the positioning of each satellite in the mechanical structure. The mounting means are adapted to position the satellites in axial, inclined and radial separations at a distance to ensure that each satellite will not come in contact with each other in short duration as well as long duration of orbit evolution. The mounting means is adapted to position one or more satellites. First set of mounting means are arranged in the axial separation and second set of mounting means are arranged in the inclined separation and third set of mounting means are arranged in the radial separation.

The multiple satellite deployment missions pose challenges for configuring the mounting and designing the satellite separation sequence to avoid re-contact possibility as there will be a large number of bodies corresponding to satellites and spent stages. The mounting configuration will have the following constraints.

1. Axial separation for some satellites, inclined separation for some other satellites and also radial separations for a bunch of other satellites.
2. Mounting of radially separating satellites to ensure no interaction between plume of upper stage control thruster and separating satellite.
3. No part of the separation system used to deploy a satellite shall block the path of the satellites separating subsequently.

The satellites separation sequence is designed. with following mission constraints in addition to the above with respect to mounting requirement.

1. The minimum distance between all body pairs to satisfy collision probability of 1 in 100000 and positive margin in mounting configuration.
2. Satellites separating from same sequencer to have minimum of 5 s delay.
3. Minimum number of re-orientations to be used for the satellites separations.
4. Minimum time for all satellites separations.

To achieve collision free long term orbital motion of the satellites, design was carried out first by analytically placing the satellites properly in spatial as well as temporal. Later the time intervals between the satellite injections were tuned by using the full force model for orbital propagations.

In the present invention, separation of multiple satellites is done in a very short time span (not exceeding 1000 s from terminal stage cut off) meeting the probability of collision of 1 in 100000 based on distance between any two pairs of bodies with respect to their deployed sizes. Also separated bodies are having no interaction with plume of upper stage control system. The mission strategy can be explained using a flow chart as shown below.

Figure 4:
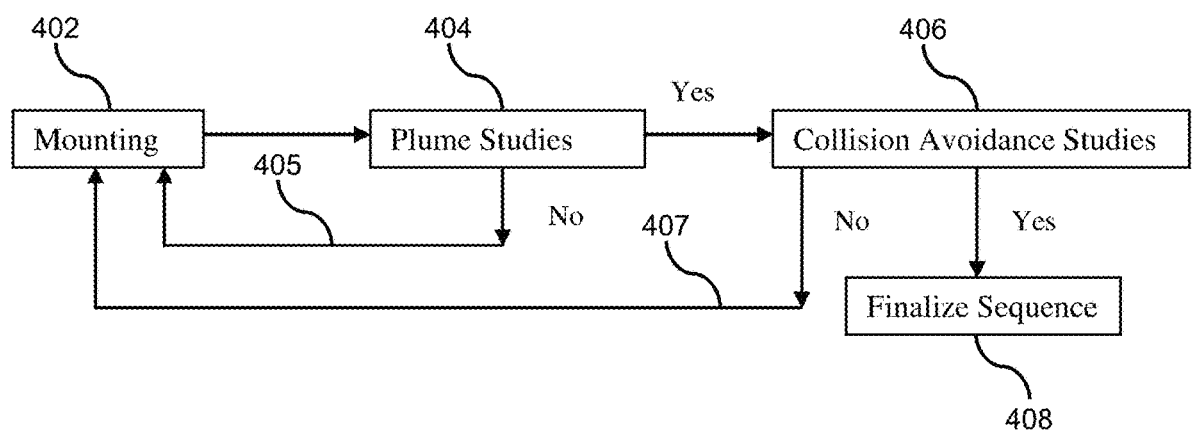
FIG. 4 illustrates a flow chart for a mission strategy in accordance to the embodiment herein.

In the present invention, separation of multiple satellites is done in a very short time span (not exceeding 1000 s from terminal stage cut off) meeting the probability of collision of 1 in 100000 based on distance between any two pairs of bodies with respect to their deployed sizes. Also separated bodies are having no interaction with plume of upper stage control system. The mission strategy can be explained using a flow chart as shown in FIG. 4. The mounting block 402 provides input to the plume studies block 404. If the result of the plume studies block 404 is No 405, the mounting block 402 is performed again. If the result of the plume studies block 404 is Yes, the collision avoidance studies block 406 is performed. If the result of the collision avoidance studies block 406 is No 407, the mounting block 402 is performed again. If the result of the collision avoidance studies block 406 is Yes, the finalize sequence block 408 is performed.

Figure 2:
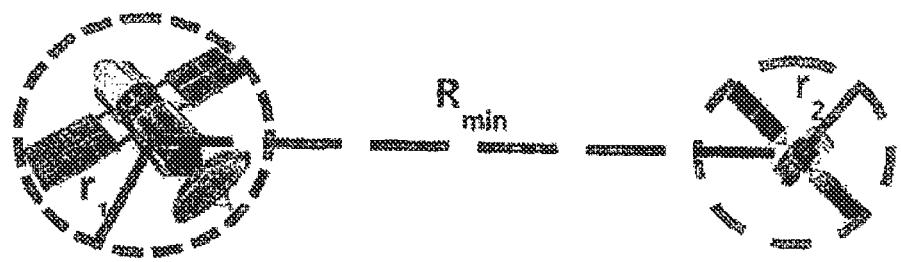
FIG. 2 illustrates a schematic representation showing minimum distance between two satellites in accordance to the embodiment herein.

A new method is devised to compute the distance between the satellites for any given probability of collision.
Calculations of Safe Re-Contact Distance:

The characteristic radius of a satellite/upper stage is the radius of sphere circumscribing it. Let r1 and r2 be the characteristic radii of two satellites considered [Refer FIG. 2] and Rmin be the minimum distance between them and Rs is the effective collision radius (=r1+r2). The maximum collision probability is given as:

$$P_{max} = \frac{4}{\pi s}\left(\frac{R_s}{R_{min}}\right)^2$$

The collision probability threshold for Space Object Proximity Analysis (SOPA) is 1 in 1000 and for Collision Avoidance (COLA) is 1 in 1,00,000 in the orbital phase. The collision probability threshold for COLA is conservative to account for injection uncertainties, whereas for routine SOPA and SOPA for orbit manoeuvres it is relaxed. The invention provides a novel solution for the separation of multiple satellites with small masses in to a circular orbit.

For satellites separating with same delta-v, the in-track component of the separation delta-v can be configured by selecting the appropriate direction of separation. For arriving at a systematic separation sequence all the satellites are separated in the orbital plane. The in-track delta-v components are arranged in the desired order (descending or ascending) by selecting the appropriate direction of separation in the orbital plane. For avoiding short term overtaking by the satellites, it is required to have the in-track delta v in the descending order of their magnitude.

The satellites separating in the opposite direction will always have the time period difference between them except for the case of separation in exactly radial direction. Hence we divide the satellites in two groups, one separating in the velocity direction and the other separating in the anti-velocity direction and solve for sequence timing for one group of the satellites and separate other simultaneously with same timings. A small roll rate between 0.20 to 0.35 deg/s is used to get the desired angle for separation in the orbital plane. The design methodology is used for radial separations only. For axial separation, all the satellites are separated at fixed optimal attitude to meet the desired minimum distance.

After separation of the satellites in axial direction, the reorientation of upper stage is done to ensure separation of other satellites in the orbital plane along velocity and anti-velocity directions. The differential velocity between the two separating pairs is ensured by separating them in velocity and anti-velocity directions. Vehicle longitudinal axis is aligned with orbit normal direction and then rotated with rate between 0.20 to 0.35 deg/s and the timing of the separation is selected so as to achieve the direction of separation in the orbital plane to provide in-track delta-v difference between the two separations in the same direction. This ensures that the two satellites separating do not come in contact with each other on short period as well as long period of orbit evolution.

The sequence works even if the vehicle is not rotated, due to rotation of the velocity vector from 0 to 360 degree in one orbit. The direction of the satellites separation will change naturally with respect to local plane providing effect of natural rolling of the vehicle (assuming vehicle longitudinal axis is aligned with orbit normal vector) with appropriate rate for circular orbit. This rate is additionally available for intentional roll rate case also. Due to very small rate, this will take a longer duration for separations. The method also includes taking visuals of all the satellite separation events using cameras positioned appropriately.

For example, The mounting of 25 Quad Packs (containing 101 satellites), two ISRO Nanosats and main satellite were arranged with symmetry about the vehicle yaw axis, such that none of the separating satellites would not enter the control system plume by virtue of mounting itself. Then the minimum distance between each pair of satellite is computed using a sphere encompassing the maximum deployed size of each satellite to ensure 1 in 100000 probability of collision. The separation sequence is designed with an intentional roll rate to separate the two radially separating satellites simultaneously in velocity and anti-velocity directions with finite time gap thereby ensuring that the gaps are increasing in first 10 orbits for all the 5460 pairs of objects.

FIG. 3 illustrates a flow diagram 300 for deploying and launching multiple satellites using a mechanical structure at a launching vehicle in accordance to the embodiment herein. In step 302, the multiple satellites in a one or more mounting means provided in the mechanical structure are positioned, wherein the mounting means are arranged at a distance to satisfy the long term collision free requirement based on a maximum collision probability (Pmax). In step 304, first set of satellites in axial direction and second set of satellites in radial direction are separated from the multiple satellites. In step 306, second set of satellites into two groups based on velocity direction and anti-velocity direction is divided. In step 308, the satellites grouped under any one of the two groups with a small roll rate between 0.20 to 0.35 degrees to ensure separation of satellites in an orbital plane along velocity and anti-velocity directions are re-oriented and separated. In step 310, launching the first set of satellites arranged in axial direction, part of the second set of satellites arranged in radial direction and remaining part of the second set of satellites arranged in inclined direction from the launch vehicle to separate them with appropriate in-track delta v distribution. The video imaging system is appropriately mounted and positioned which can capture all separation events. The separating step ensures that all the satellites can be separated at optimal attitude to meet the desired minimum distance for all separation. The re-orienting step a roll rate controllability is achieved between 0.20 to 0.35 degrees to get the desired angle and direction of separation in the orbital plane. The roll-rate and the timing of the separation is selected so as to achieve the direction of separation in the orbital plane to provide the desired in-track delta-v difference between the two separations to ensure that the two satellites separating do not come in contact with each other on short period as well as long period of orbit evolution. The separating step ensures no interaction between plume of upper stage control thruster and separating satellites.

The present embodiment facilitates the system and methodology for safe deployment of multiple satellites in short duration of time. The method comprises of designing a mounting configuration for multiple satellites to ensure safe separation and configuring the separation sequence with manoeuvring to ensure clean separation of multiple satellites, safe movement between the separated satellites and prevent any interaction between the satellites and launch vehicle control system plume during separation. The satellites separation direction is finalized such that after separation they will have no possibility of entering the control system plume. Once this is finalized the proximity analysis is done to have sufficient gap between the separating satellites by adjusting the time of separation. The method also includes capturing video images of all the satellite separation events using video imaging systems positioned appropriately. The technical advantages of the present embodiment are as follows:

1. Achieved axial separation of the first batch of satellites to be separated, inclined separation of the second batch of satellites to be separated and radial separation of the remaining satellites.
2. It is ensured that all satellite separations were completed within the short mission duration with 1 in 100000 probability of collision after stage cut-off as against the normal sequence without the manoeuvre.
3. Minimum time delay is ensured for the satellites separating from same sequencer.
4. Minimum numbers of re-orientations are used for the satellite separations.
5. It is ensured that all separated satellites have an ever increasing gap among themselves in the first 10 orbits.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

The invention claimed is:

1. A method for deploying and launching multiple satellites using a mechanical structure at a launching vehicle, said method comprising:
    positioning said multiple satellites in a plurality of mounts provided in said mechanical structure, wherein said mounts are arranged at a distance to satisfy a collision free requirement based on a maximum collision probability ($P_{max}$);
    a separating step of separating a first set of satellites in an axial direction and a second set of satellites in a radial direction;
    dividing a second set of satellites into two groups based on a velocity direction and an anti-velocity direction;
    a re-orienting step of re-orienting a stage and separating the satellites grouped under any one of said two groups with a roll rate between 0.20 to 0.35 degrees to ensure separation of satellites in an orbital plane along the velocity and anti-velocity directions; and
    launching said first set of satellites arranged in the axial direction, a part of said second set of satellites arranged in the radial direction and a remaining part of said second set of satellites arranged in an inclined direction from said launch vehicle to separate said first and second sets of satellites with in-track delta v distribution.

2. The method as claimed in claim 1, wherein a video imaging system is mounted and positioned to capture all separation events.

3. The method as claimed in claim 1, wherein said separating step ensures that all the satellites are separated at an optimal attitude to meet a desired minimum distance for all separation.

4. The method as claimed in claim 1, wherein at said re-orienting step a roll rate controllability is achieved between 0.20 to 0.35 degrees to get a desired angle and direction of separation in the orbital plane.

5. The method as claimed in claim 4, wherein the roll rate and a timing of the separation is selected so as to achieve the direction of separation in the orbital plane to provide a desired in-track delta-v difference between the two separations to ensure that two satellites separating do not come in contact with each other on an orbit evolution.

6. The method as claimed in claim 1, wherein said separating step ensures no interaction between a plume of an upper stage control thruster and separating satellites.

7. A method for launching multiple satellites, which include first and second sets of satellites, from a launch vehicle comprising:
    monitoring, by an image capturing system, positioning of each satellite of the multiple satellites in multiple mounts including a first set of mounts for axial separation, a second set of mounts for inclined separation, and a third set of mounts for radial separation;
    controlling the multiple mounts to position the multiple satellites in axial, inclined and radial separations at a distance to ensure that each satellite will not come in contact with each other in an orbit evolution;
    dividing the second set of satellites into a part of the second set of satellites and a remaining part of the second set of satellites based on a velocity direction and an anti-velocity direction; and
    launching the first set of satellites in an axial direction, the part of the second set of satellites in a radial direction, and the remaining part of the second set of satellites in an inclined direction from the launch vehicle to separate the first and second sets of satellites with in-track delta v distribution.

8. The method as claimed in claim 7, further comprising:
   determining the distance between the separation of satellites based on maximum collision probability ($P_{max}$) which is derived from the following equation:

$$P_{max} = \frac{4}{\pi s}\left(\frac{R_s}{R_{min}}\right)^2$$

wherein $R_{min}$ is the minimum distance between the separation of satellites and $R_s$ is the effective collision radius.

* * * * *